United States Patent
Wang et al.

(10) Patent No.: US 11,392,139 B2
(45) Date of Patent: Jul. 19, 2022

(54) METHOD, APPARATUS AND CONTROL SYSTEM FOR CONTROLLING MOBILE ROBOT

(71) Applicant: Baidu Online Network Technology (Beijing) Co., Ltd., Beijing (CN)

(72) Inventors: Yue Wang, Beijing (CN); Zelin Wu, Beijing (CN); Jingjing Xue, Beijing (CN); Yingnan Liu, Beijing (CN); Wenlong Rao, Beijing (CN); Shi Hu, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/025,794

(22) Filed: Sep. 18, 2020

(65) Prior Publication Data
US 2021/0004022 A1 Jan. 7, 2021

Related U.S. Application Data

(63) Continuation of application No. PCT/CN2019/103251, filed on Aug. 29, 2019.

(30) Foreign Application Priority Data

Nov. 20, 2018 (CN) .......................... 201811381992.1

(51) Int. Cl.
*G05D 1/02* (2020.01)
(52) U.S. Cl.
CPC ......... *G05D 1/0276* (2013.01); *G05D 1/0214* (2013.01); *G05D 2201/0213* (2013.01)
(58) Field of Classification Search
CPC ............... G05D 1/0276; G05D 1/0214; G05D 2201/0213; G05D 1/0011;
(Continued)

(56) References Cited

U.S. PATENT DOCUMENTS

| 9,983,013 | B1* | 5/2018 | Krunic | G01C 21/3697 |
|---|---|---|---|---|
| 2010/0211264 | A1 | 8/2010 | Wey | |
| 2012/0313779 | A1 | 12/2012 | Papaefstathiou | |

(Continued)

FOREIGN PATENT DOCUMENTS

| CN | 104350442 A | 2/2015 |
|---|---|---|
| CN | 104820424 A | 8/2015 |

(Continued)

OTHER PUBLICATIONS

International Search Report in International Application No. PCT/CN2019/103251, dated Nov. 27, 2019 (6 pages).
Extended European Search Report for Application No. 19887693.0, dated Oct. 4, 2021 (17 pages).

*Primary Examiner* — Rodney A Butler
(74) *Attorney, Agent, or Firm* — Nixon Peabody LLP

(57) ABSTRACT

A method, an apparatus and a control system for controlling a mobile robot are provided. The method includes: receiving a motion mode change request sent by a target mobile robot, the motion mode change request including motion mode information, and the motion mode information being information of a motion mode to be obtained by change requested by the target mobile robot; determining whether the target mobile robot has a permission to move in the motion mode; and sending motion confirmation information for the motion mode change request to the target mobile robot to control the target mobile robot to move in the motion mode, in response to determining that the target mobile robot has the permission.

17 Claims, 5 Drawing Sheets

(58) Field of Classification Search
CPC ... G05D 2201/0203; G05D 2201/0209; G05D 2201/0217; G05D 1/0221; G05D 1/0223; G05D 1/0282; G05D 1/0225; G05D 1/0246; G05D 1/0259; G05D 1/028; G05D 1/0285
See application file for complete search history.

(56) References Cited

U.S. PATENT DOCUMENTS

| | | | |
|---|---|---|---|
| 2016/0125735 A1 | 5/2016 | Tuukkanen | |
| 2016/0179092 A1* | 6/2016 | Park | G05D 1/0088 |
| | | | 701/23 |
| 2017/0313320 A1 | 11/2017 | Asakura et al. | |
| 2018/0335777 A1* | 11/2018 | Gibbs | G05D 1/0297 |

FOREIGN PATENT DOCUMENTS

| | | |
|---|---|---|
| CN | 105739534 A | 7/2016 |
| CN | 106828188 A | 6/2017 |
| CN | 106856502 A | 6/2017 |
| CN | 107784850 A | 3/2018 |
| CN | 108058712 A | 5/2018 |
| CN | 108200168 A | 6/2018 |
| CN | 207946703 U | 10/2018 |
| CN | 109189082 A | 1/2019 |
| EP | 2857918 A1 | 4/2015 |
| EP | 3287334 A2 | 2/2018 |
| JP | 2005239315 A | 9/2005 |
| JP | 2017197066 A | 11/2017 |
| WO | WO 2014/029492 A1 | 2/2014 |

* cited by examiner

METHOD, APPARATUS AND CONTROL SYSTEM FOR CONTROLLING MOBILE ROBOT

CROSS-REFERENCE TO RELATED APPLICATIONS

This patent application is a continuation of International Application No. PCT/CN2019/103251, filed on Aug. 29, 2019, which claims priority to Chinese Patent Application No. 201811381992.1, filed on Nov. 20, 2018, titled "Method, Apparatus and Control system for Controlling Mobile Robot," applicant of which is Baidu Online Network Technology (Beijing) Co., Ltd. The disclosures of the aforementioned applications are hereby incorporated by reference in their entireties.

TECHNICAL FIELD

Embodiments of the present disclosure relate to the field of computer technology, specifically to a method, apparatus and control system for controlling a mobile robot.

BACKGROUND

Mobile robots are machineries that perform tasks automatically. The Mobile robots may accept human commands, run pre-arranged programs, and also act based on principles formulated with artificial intelligence technology.

SUMMARY

Embodiments of the present disclosure propose a method, apparatus and control system for controlling a mobile robot.

In a first aspect, an embodiment of the present disclosure provides a method for controlling a mobile robot. The method includes: receiving a motion mode change request sent by a target mobile robot, the motion mode change request comprising motion mode information, and the motion mode information being information of a motion mode to be obtained by change requested by the target mobile robot; determining whether the target mobile robot has a permission to move in the motion mode; and sending motion confirmation information for the motion mode change request to the target mobile robot to control the target mobile robot to move in the motion mode, in response to determining that the target mobile robot has the permission.

In some embodiments, the motion mode change request further includes an identification of the target mobile robot; and determining whether the target mobile robot has a permission to move in the motion mode includes: inputting the identification into a predetermined motion permission model to obtain motion permission information of the target mobile robot, wherein the motion permission model is configured to represent a corresponding relationship between the identification of the mobile robot and the motion permission information of the mobile robot, and the motion permission information represents any one of: permission, or no permission.

In some embodiments, the determining whether the target mobile robot has a permission to move in the motion mode, includes: acquiring at least one of location information, or status information of the target mobile robot; and determining whether the target mobile robot has the permission to move in the motion mode, based on the acquired information.

In some embodiments, the method further includes: acquiring a real-time motion speed, real-time location information, real-time status information, and real-time environment information of the target mobile robot according to a predetermined frequency; and determining whether to send at least one of warning information or a motion mode change instruction to the target mobile robot, based on the real-time motion speed, the real-time location information, the real-time status information, and the real-time environment information.

In some embodiments, the sending motion confirmation information for the motion mode change request to the target mobile robot, comprises includes: sending the motion confirmation information for the motion mode change request to the target mobile robot using an over the air technology.

In some embodiments, the movement mode change request includes any one of: a start request, a stop request, an acceleration request, a deceleration request, and a turning request.

In some embodiments, the target mobile robot is an autonomous vehicle.

In a second aspect, an embodiment of the present disclosure provides an apparatus for controlling a mobile robot. The device includes: a receiving unit, configured to receive a motion mode change request sent by a target mobile robot, the motion mode change request comprising motion mode information, and the motion mode information being information of a motion mode to be obtained by change requested by the target mobile robot; a first determining unit, configured to determine whether the target mobile robot has a permission to move in the motion mode; and a sending unit, configured to send motion confirmation information for the motion mode change request to the target mobile robot to control the target mobile robot to move in the motion mode, in response to determining that the target mobile robot has the permission.

In some embodiments, the motion mode change request further includes an identification of the target mobile robot; and the first determining unit includes: an input module, configured to input the identification into a predetermined motion permission model to obtain motion permission information of the target mobile robot, wherein the motion permission model is configured to represent a corresponding relationship between the identification of the mobile robot and the motion permission information of the mobile robot, and the motion permission information represents any one of: permission, or no permission.

In some embodiments, the first determining unit includes: an acquisition module, configured to acquire at least one of location information, or status information of the target mobile robot; and a determination module, configured to determine whether the target mobile robot has the permission to move in the motion mode, based on the acquired information.

In some embodiments, the apparatus further includes: an acquisition unit, configured to acquire a real-time motion speed, real-time location information, real-time status information, and real-time environment information of the target mobile robot according to a predetermined frequency; and a second determining unit, configured to determine whether to send at least one of warning information or a motion mode change instruction to the target mobile robot, based on the real-time motion speed, the real-time location information, the real-time status information, and the real-time environment information.

In some embodiments, the sending unit includes: a sending module, configured to send the motion confirmation information for the motion mode change request to the target mobile robot using an over the air technology.

In some embodiments, the movement mode change request includes any one of: a start request, a stop request, an acceleration request, a deceleration request, and a turning request.

In some embodiments, the target mobile robot is an autonomous vehicle.

In a third aspect, an embodiment of the present disclosure provides a control system, the system includes a mobile robot and a server for providing support to the mobile robot, wherein the mobile robot is configured to: send a motion mode change request to the server, in response to receiving a motion mode change instruction inputted by a user, the motion mode change request comprising motion mode information of a motion mode to be obtained by change requested by the target mobile robot; the server is configured to: determine whether the mobile robot has a permission to move in the motion mode; and send motion confirmation information for the motion mode change request to the mobile robot, in response to determining that the mobile robot has the permission.

In some embodiments, the mobile robot is further configured to move in the motion mode.

In some embodiments, the server is further configured to: acquire a real-time motion speed, real-time location information, real-time status information, and real-time environment information of the mobile robot according to a predetermined frequency; and determine whether to send at least one of warning information or the motion mode change instruction to the mobile robot, based on the real-time motion speed, the real-time location information, the real-time status information, and the real-time environment information.

In a fourth aspect, an embodiment of the present disclosure provides an electronic device for controlling a mobile robot, including: one or more processors; a storage apparatus storing one or more programs, the one or more programs, when executed by the one or more processors, cause the one or more processors to implement the method according to any one of the above-mentioned methods for controlling a mobile robot.

In a fifth aspect, an embodiment of the present disclosure provides a computer readable medium for controlling a mobile robot, on which a computer program is stored, and when the program is executed by a processor, any one of the above methods for controlling a mobile robot is implemented.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

According to the method, apparatus and control system for controlling a mobile robot provided by embodiments of the present disclosure, first, a motion mode change request sent by a target mobile robot is received, the motion mode change request including motion mode information, and the motion mode information being information of a motion mode to be obtained by change requested by the target mobile robot; then, whether the target mobile robot has a permission to move in the motion mode is determined; and finally, motion confirmation information for the motion mode change request is sent to the target mobile robot to control the target mobile robot to move in the motion mode, in response to determining that the target mobile robot has the permission. Therefore, by determining whether the mobile robot has the permission to move in the motion mode, whether to change the mobile robot to the motion mode is determined, rather than directly changing the motion mode by the mobile robot, thereby improving the motion safety of the mobile robot.

Figure 1:
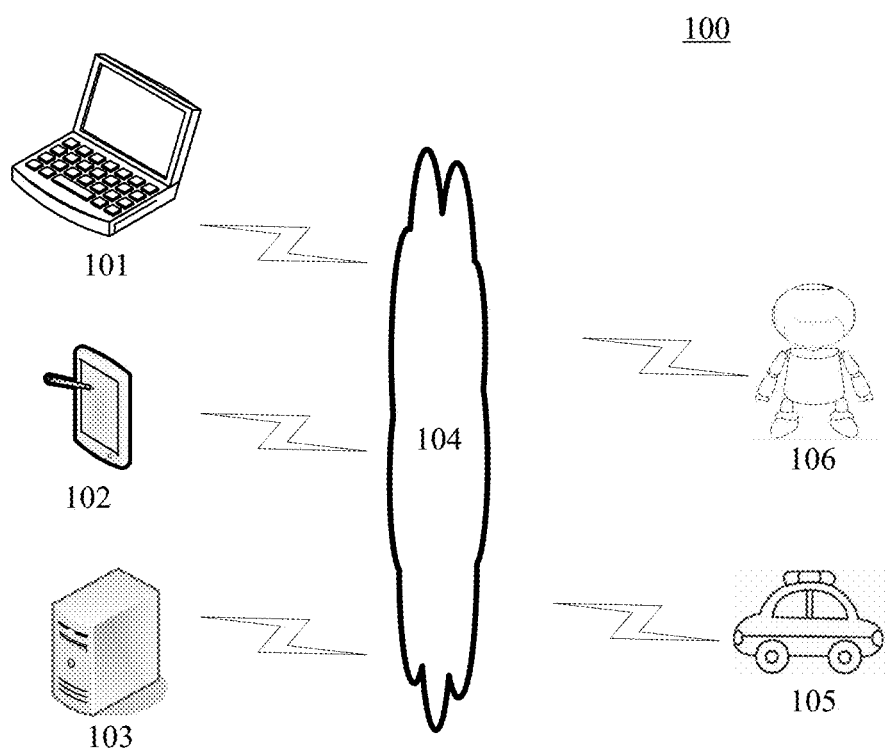
FIG. 1 is a diagram of an example system architecture in which an embodiment of the present disclosure may be applicable.

FIG. 1 illustrates an example system architecture 100 of an embodiment of a method for controlling a mobile robot, an apparatus for controlling a mobile robot, or a control system in which embodiments of the present disclosure may be applicable.

As shown in FIG. 1, the system architecture 100 may include terminal devices 101, 102, a server 103, a network 104, and mobile robots 105 and 106. The network 104 is used to provide a communication link medium between the terminal devices 101, 102, the server 103 and the mobile robots 105 and 106. The network 104 may include various types of connections, such as wired, wireless communication links, or optic fibers.

The terminal devices 101, 102, the server 103, and the mobile robots 105, 106 may interact via the network 104 to receive or send data (for example, the mobile robots 105, 106 may send a motion mode change request to the terminal devices 101, 102 or the server 103 via the network 104) and the like. Various communication client applications may be installed on the terminal devices 101 and 102, such as mobile robot control applications, data processing applications, image processing applications, web browser applications, shopping applications, search applications, instant messaging tools, Email clients, or social platform software.

The terminal devices 101 and 102 may be hardware or software. When the terminal devices 101 and 102 are hardware, they may be various electronic devices, including but not limited to smart phones, tablet computers, laptop portable computers, desktop computers, or the like. When the terminal devices 101 and 102 are software, they may be installed in the above-listed electronic devices. They may be implemented as a plurality of software pieces or software modules (for example, software pieces or software modules for providing distributed services), or as a single software piece or software module, which is not specifically limited herein. For example, the software installed in the terminal devices 101 and 102 may process received data (for example, based on the motion mode change request sent by the mobile robot 105 and 106, whether the mobile robots have a permission to move in a motion mode indicated by the motion mode change request is determined), and feed back a processing result (for example, motion confirmation information for the motion mode change request) to the mobile robots 105 and 106.

The server 105 may be a server that provides various services, such as a backend server that processes data sent by the mobile robots 105 and 106. The backend server may process received data (for example, based on the motion mode change request sent by the mobile robot 105 and 106, whether the mobile robots have a permission to move in a motion mode indicated by the motion mode change request is determined), and feed back a processing result (for example, motion confirmation information for the motion mode change request) to the mobile robots 105 and 106.

It should be noted that the server may be hardware or software. When the server is hardware, it may be implemented as a distributed server cluster composed of a plurality of servers, or as a single server. When the server is software, it may be implemented as a plurality of software or software modules (for example, software pieces or software modules for providing distributed services) or as a single software piece or software module, which is not specifically limited herein.

The mobile robots 105 and 106 may be various movable (i.e., mobile) machineries. For example, the mobile robots 105 and 106 may include, but are not limited to: aerial robots (such as drones), wheeled mobile robots (such as autonomous vehicles), walking mobile robots (one-legged, two-legged, and multi-legged mobile robots), crawler mobile robots, crawling robots, creeping robots, swimming robots, medical robots, military robots, handicapped-assisting robots, cleaning robots, etc. The mobile robots 105 and 106 may send a motion mode change request to the terminal devices 101 and 102 or the server 103 to request a change of the motion mode. After receiving motion confirmation information for the motion mode change request, the mobile robots 105 and 106 may further move in the motion mode.

It should be noted that the method for controlling a mobile robot provided by the embodiments of the present disclosure may be performed by the server 103. Accordingly, the apparatus for controlling a mobile robot may be disposed in the server 103. In addition, the method for controlling a mobile robot provided by the embodiments of the present disclosure may alternatively be performed by the terminal devices 101 and 102. Accordingly, an apparatus for controlling a mobile robot may alternatively be disposed in the terminal devices 101 and 102. Alternatively, the method for controlling a mobile robot provided in the embodiments of the present disclosure may be performed by the mobile robots 105 and 106. Accordingly, the apparatus for controlling a mobile robot may be provided in the mobile robots 105 and 106.

It should be understood that the number of terminal devices, networks, servers and mobile robots in FIG. 1 is merely illustrative. Depending on the implementation needs, there may be any number of terminal devices, networks, servers and mobile robots. When an electronic device on which the method for controlling a mobile robot is implemented does not need to transmit data with other electronic devices other than the mobile robot, the system architecture may only include the electronic device and the mobile robot on which the method for controlling a mobile robot runs.

Figure 2:
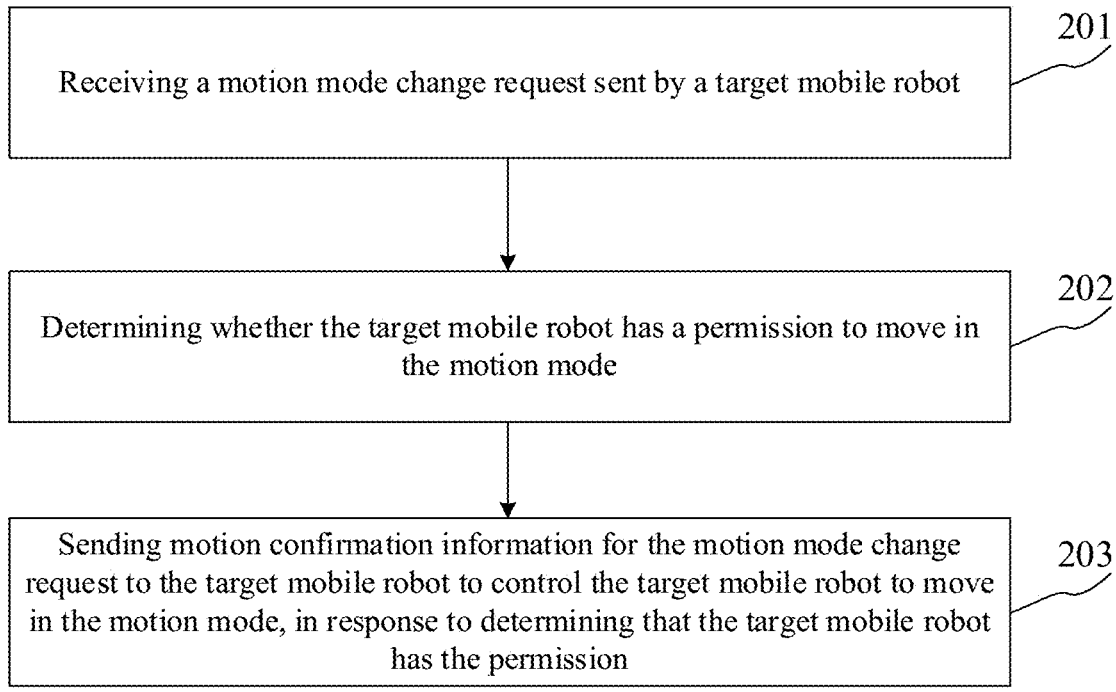
FIG. 2 is a flowchart of an embodiment of a method for controlling a mobile robot according to the present disclosure.

With further reference to FIG. 2, a flow 200 of an embodiment of a method for controlling a mobile robot according to the present disclosure is illustrated. The method for controlling a mobile robot includes the following steps.

Step 201 includes receiving a motion mode change request sent by a target mobile robot.

In the present embodiment, an executing body of the method for controlling a mobile robot (for example, the server or the terminal device shown in FIG. 1) may receive the motion mode change request sent by the target mobile robot.

The target mobile robot may be various movable (i.e., mobile) machineries. For example, the target mobile robot may include, but is not limited to: aerial robots (such as drones), wheeled mobile robots, walking mobile robots (one-legged, two-legged, and multi-legged mobile robots), crawler mobile robots, crawling robots, creeping robots, swimming robots, medical robots, military robots, handicapped-assisting robots, cleaning robots, etc.

In some alternative implementations of the present embodiment, the target mobile robot may be an autonomous vehicle.

The motion mode change request may be information for representing the target mobile robot requesting a change of the motion mode. The motion mode change request may include motion mode information, and the motion mode information may be information of a motion mode to be obtained by change requested by the target mobile robot.

In some alternative implementations of the present embodiment, the motion mode change request includes any one of the following: a start request, a stop request, an acceleration request, a deceleration request, or a turning request.

In some alternative implementations of the present embodiment, the motion mode change request further includes an identification of the target mobile robot.

Step 202 includes determining whether the target mobile robot has a permission to move in the motion mode.

In the present embodiment, the executing body may determine whether the target mobile robot has the permission to move in the motion mode indicated by the motion mode information included in the motion mode change request received in step 201.

It may be understood that when the target mobile robot has the permission to move in the motion mode, it may generally represent that the target mobile robot may move in the motion mode; and when the target mobile robot does not have the permission to move in the motion mode, it may generally represent that the target mobile robot cannot move in the motion mode.

In some alternative implementations of the present embodiment, the motion mode change request further includes the identification of the target mobile robot, based on this, the executing body may perform step 202 according to the following step:

inputting the identification into a predetermined motion permission model to obtain motion permission information of the target mobile robot. Here, the motion permission model may be configured to represent a corresponding relationship between the identification of the mobile robot and the motion permission information of the mobile robot. The motion permission information represents any one of the following: permission, or no permission. The identification may be a character string composed of numbers, letters, symbols (for example, underscores, etc.).

The motion permission model may be a two-dimensional table or database storing identifications and the motion permission information of mobile robots. Alternatively, the motion permission model may be a model obtained by training an initial model (for example, a convolutional neural network) using a machine learning algorithm. Here, the technology of using a machine learning algorithm to train and obtain the model is a well-known technology that has been extensively studied at present, and detailed description thereof will be omitted.

In some alternative implementations of the present embodiment, the executing body may alternatively perform step 202 according to the following steps.

Step one includes acquiring at least one item of following information of the target mobile robot: location information, or status information.

The location information may be used to represent the location of the mobile robot.

The status information may be used to represent the status of the mobile robot. For example, the status information may include, but is not limited to: information about whether there is a fault, information about whether a fault affects motion, information about the location of a fault point, and the like.

Step two includes determining whether the target mobile robot has the permission to move in the motion mode, based on the acquired information.

Here, the executing body may input the acquired information (including at least one of the location information or the status information) into the permission model pre-trained for the target mobile robot to obtain the motion permission information. Here, the permission model may be used to represent a corresponding relationship between the acquired information (including at least one of the location information or the status information) and the motion permission information. The motion permission information may represent any one of the following: permission, or no permission.

Specifically, when the acquired information includes the location information but does not include the status information, the permission model may be used to represent a corresponding relationship between the location information and the motion permission information of the mobile robot. In this application scenario, the permission model may be a two-dimensional table or database storing the location information of the mobile robot and the motion permission information of the mobile robot.

Specifically, when the acquired information includes the status information but does not include the location information, the permission model may be used to represent a corresponding relationship between the status information and the motion permission information of the mobile robot. In this application scenario, the permission model may be a two-dimensional table or database storing the status information of the mobile robot and the motion permission information of the mobile robot.

When the acquired information includes the location information and the status information, the permission model may be used to represent a corresponding relationship between the location information and the status information, and the motion permission information of the mobile robot. In this application scenario, the permission model may be a two-dimensional table or database storing the location information and the status information of the mobile robot, and the motion permission information of the mobile robot.

Alternatively, the permission model may be a model obtained by training an initial model (for example, a convolutional neural network) using a machine learning algorithm. Here, the technology of using a machine learning algorithm to train to obtain the model is a well-known technology that has been extensively studied at present, and detailed description thereof will be omitted.

Step 203 includes sending motion confirmation information for the motion mode change request to the target mobile robot to control the target mobile robot to move in the motion mode, in response to determining that the target mobile robot has the permission.

In the present embodiment, when it is determined that the target mobile robot has the permission to move in the motion mode, the executing body may send the motion confirmation information for the motion mode change request to the target mobile robot to control the target mobile robot to move in the motion mode.

The motion confirmation information may be used to represent that the executing body confirms the motion mode change request. After the executing body sends the motion confirmation information to the mobile robot, the target mobile robot may move in the motion mode indicated by the motion mode information included in the motion mode change request corresponding to the motion confirmation information.

In some alternative implementations of the present embodiment, the executing body may send the motion confirmation information for the motion mode change request to the target mobile robot using an over the air technology (OTA).

Here, the over the air technology is a technology for remotely managing SIM card data and applications through an air interface of mobile communication. The use of the over the air technology may simplify an operation process of sending a start instruction to the mobile robot.

Figure 3:
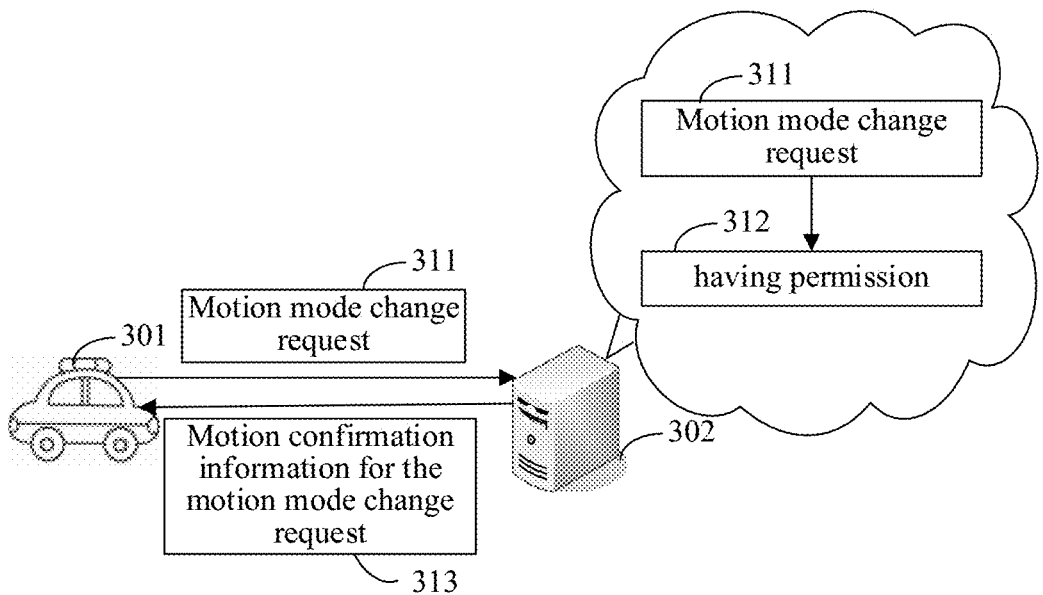
FIG. 3 is a schematic diagram of an application scenario of the method for controlling a mobile robot according to the present disclosure.

With further reference to FIG. 3, FIG. 3 is a schematic diagram of an application scenario of the method for controlling a mobile robot according to the present embodiment. In the application scenario of FIG. 3, a cloud server 302 receives a motion mode change request 311 sent by a target mobile robot 301. The motion mode change request 311 may include motion mode information (for example, start moving at a speed of 50 kilometers per hour) of a motion mode to be obtained by change requested by the target mobile robot 301. Then, the cloud server 302 may determine whether the target mobile robot 301 has a permission to move in the motion mode. For example, the cloud server 302 may search for a speed value corresponding to the identification of the target mobile robot 301 in a two-dimensional table storing the identification of the mobile robot and the speed value of the maximum speed at which the mobile robot starts moving. If the speed value obtained by the search is greater than or equal to the speed value indicated by the motion mode information (for example, 50), the cloud server 302 may determine that the target mobile robot 301 has the permission to move in the motion mode. If the speed value obtained by the search is smaller than the speed value indicated by the motion mode information (for example, 50), the cloud server 302 may determine that the target mobile robot 301 does not have the permission to move in the motion mode (i.e., no permission). Here, the cloud server 302 determines, according to above method, permission information 312 (no permission shown in the figure) based on the identification of the target mobile robot 301 included in the motion mode change request 311. Finally, the cloud server 302 sends motion confirmation information 313 for the motion mode change request 311 to the target mobile robot 301 to control the target mobile robot 301 to move in the motion mode. Thereafter, the target mobile robot 301 may move in the motion mode.

According to method provided by the above embodiments of the present disclosure, a motion mode change request sent by a target mobile robot is received, the motion mode change request including motion mode information of a motion mode to be obtained by change requested by the target mobile robot, then, whether the target mobile robot has a permission to move in the motion mode is determined, and finally, motion confirmation information for the motion mode change request is sent to the target mobile robot to control the target mobile robot to move in the motion mode, in response to determining that the target mobile robot has the permission. Therefore, by determining whether the mobile robot has the permission to move in the motion mode, whether the mobile robot changes the motion mode is determined, rather than directly changing the motion mode by the mobile robot, thereby improving the motion safety of the mobile robot.

Figure 4:
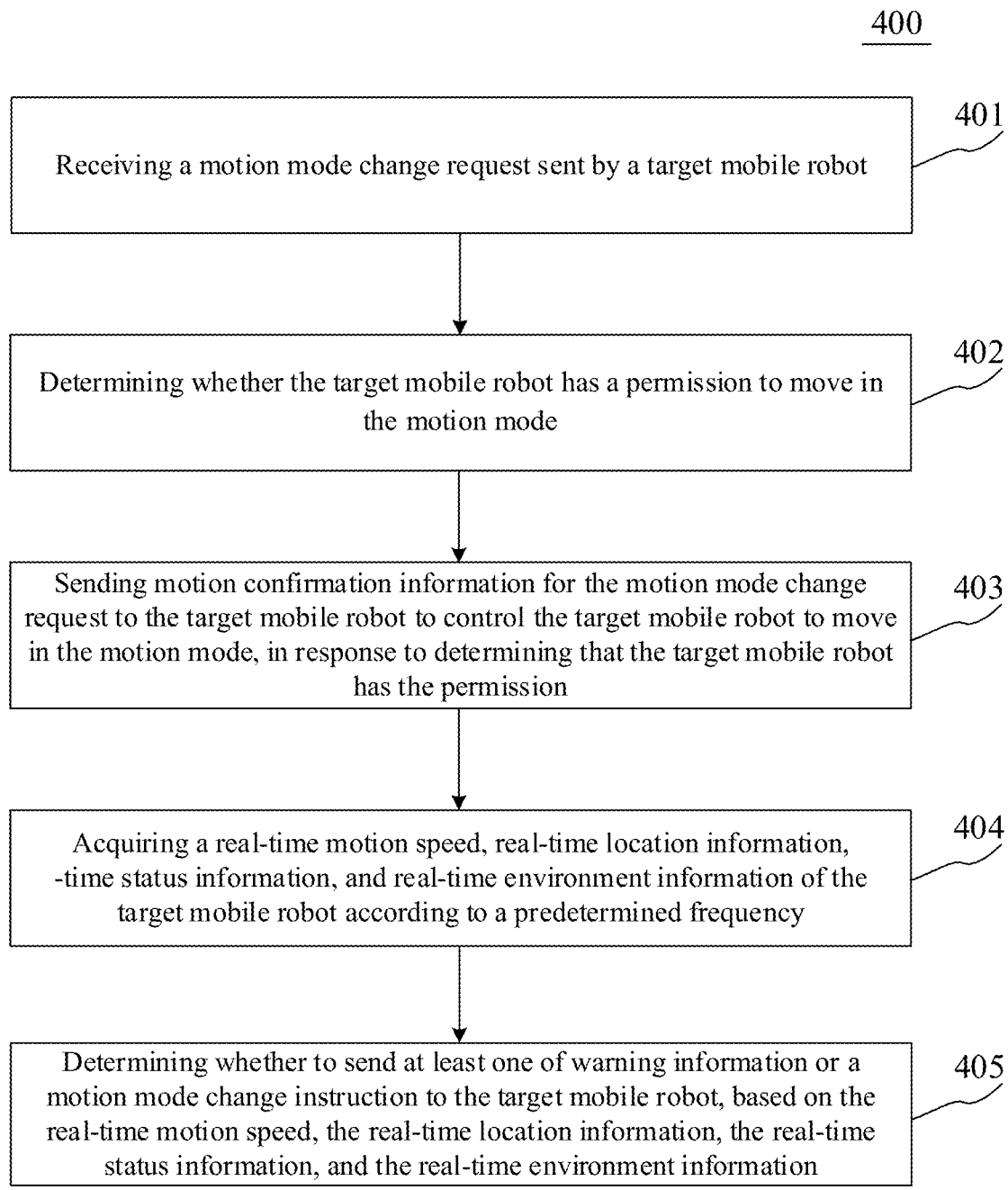
FIG. 4 is a flowchart of another embodiment of the method for controlling a mobile robot according to the present disclosure.

With further reference to FIG. 4, a flow 400 of another embodiment of the method for controlling a mobile robot is illustrated. The flow 400 of the method for controlling a mobile robot includes the following steps.

Step 401 includes receiving a motion mode change request sent by a target mobile robot.

Step 402 includes determining whether the target mobile robot has a permission to move in the motion mode.

Step 403 includes sending motion confirmation information for the motion mode change request to the target mobile robot to control the target mobile robot to move in the motion mode, in response to determining that the target mobile robot has the permission.

In the present embodiment, the specific implementation of the above step 401-step 403 is basically the same as the step 201-step 203 in the embodiment corresponding to FIG. 2, and detailed description thereof will be omitted.

Step 404 includes acquiring a real-time motion speed, real-time location information, real-time status information, and real-time environment information of the target mobile robot according to a predetermined frequency.

In the present embodiment, an executing body of the method for controlling a mobile robot (for example, the server or the terminal device shown in FIG. 1) may acquire the real-time motion speed, the real-time location information, the real-time status information, and the real-time environment information of the target mobile robot according to the predetermined frequency.

The real-time motion speed may be the motion speed of the mobile robot when step 404 is performed. The real-time location information may be information that represents the location of the mobile robot when step 404 is performed. The real-time status information may be information that represents the status of the mobile robot when step 404 is performed. The real-time environment information may be information that represents the environment in which the mobile robot is located when step 404 is performed. For example, the real-time environment information may include but is not limited to at least one of the following: weather information, road condition information, or obstacle location information.

Step 405 includes determining whether to send at least one of following item to the target mobile robot: warning information, or a motion mode change instruction, based on the real-time motion speed, the real-time location information, the real-time status information, and the real-time environment information.

In the present embodiment, the executing body may determine whether to send at least one of: warning information, or a motion mode change instruction to the target mobile robot, based on the real-time motion speed, the real-time location information, the real-time status information, and the real-time environment information.

The warning information may be information used to prompt the target mobile robot or the user who controls the target mobile robot that the speed of the current target mobile robot is too large (exceeding the maximum speed that the current mobile robot can move). The motion mode change instruction may be information for instructing the target mobile robot to change the motion mode. For example, the motion mode change instruction may be information for instructing the target mobile robot to stop or decelerate.

For example, the executing body may search for transmission determining information corresponding to the real-time motion speed, the real-time location information, the real-time status information, and the real-time environment information in a predetermined information sending two-dimensional table for the target mobile robot. The information sending two-dimensional table may be configured to represent a corresponding relationship between the real-time motion speed, the real-time location information, the real-time status information, the real-time environment information, and transmission determining information. The transmission determining information may be used to represent whether to send at least one of the warning information or the motion mode change instruction to the target mobile robot. For example, the transmission determining information may be "yes" or "no" and the like.

Alternatively, the executing body may search for transmission determining information corresponding to the acquired real-time location information in a first two-dimensional table predetermined for the target mobile robot, search for transmission determining information corresponding to the acquired real-time status information in a second two-dimensional table predetermined for the target mobile robot, search for transmission determining information corresponding to the acquired real-time environment information in a third two-dimensional table predetermined for the target mobile robot, and search for transmission determining information corresponding to the acquired real-time motion speed in a fourth two-dimensional table predetermined for the target mobile robot. Then, a voting mechanism is used to determine whether to send at least one of the following: warning information, or a motion mode change instruction to the target mobile robot.

The first two-dimensional table may be configured to represent a corresponding relationship between the real-time location information and transmission determining information. The second two-dimensional table may be configured to represent a corresponding relationship between the real-time status information and transmission determining information. The third two-dimensional table may be configured to represent a corresponding relationship between the real-time environment information and transmission determining information. The fourth two-dimensional table may be configured to represent a corresponding relationship between the real-time motion speed and transmission determining information. The transmission determining information may be configured to represent whether to send at least one of the warning information or the motion mode change instruction to the target mobile robot. For example, the transmission determining information may be "yes" or "no" and the like.

For example, if three of the four pieces of obtained transmission determining information represent sending information to the target mobile robot, and the other one piece of transmission determining information represents not to send information to the target mobile robot. Then, the executing body may determine to send at least one of the warning information or the motion mode change instruction to the target mobile robot.

It can be seen from FIG. 4 that, compared with the embodiment corresponding to FIG. 2, the flow 400 of the method for controlling a mobile robot in the present embodiment highlights the step of determining whether to send at least one of: warning information, or a motion mode change instruction to the target mobile robot, based on the real-time motion speed, the real-time location information, the real-time status information, and the real-time environment information. Therefore, it may be determined in a more timely method whether there is a safety hazard in the current motion mode of the mobile robot, thereby further improving the motion safety of the mobile robot.

Figure 5:
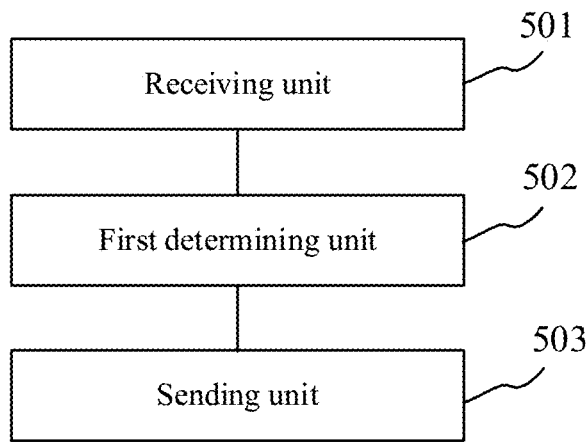
FIG. 5 is a schematic structural diagram of an embodiment of an apparatus for controlling a mobile robot according to the present disclosure.

With further reference to FIG. 5, as an implementation of the method shown in the above figures, the present disclosure provides an embodiment of an apparatus for controlling a mobile robot, and the apparatus embodiment corresponds to the method embodiment as shown in FIG. 2. In addition to the features and effects described below, the apparatus embodiment may also include the same or corresponding features and effects as the method embodiment shown in FIG. 2. The apparatus may be specifically applied to various electronic devices.

As shown in FIG. 5, an apparatus 500 for controlling a mobile robot of the present embodiment includes: a receiving unit 501, configured to receive a motion mode change request sent by a target mobile robot, the motion mode change request including motion mode information, and the motion mode information being information of a motion mode to be obtained by change requested by the target mobile robot; a first determining unit 502, configured to determine whether the target mobile robot has a permission to move in the motion mode; and a sending unit 503, configured to send motion confirmation information for the motion mode change request to the target mobile robot to control the target mobile robot to move in the motion mode, in response to determining that the target mobile robot has the permission.

In the present embodiment, the receiving unit 501 of the apparatus 500 for controlling a mobile robot may receive the motion mode change request sent by the target mobile robot.

The target mobile robot may be various movable (i.e., mobile) machineries. For example, the target mobile robot may include, but is not limited to: aerial robots (such as drones), wheeled mobile robots, walking mobile robots (one-legged, two-legged, and multi-legged mobile robots), crawler mobile robots, crawling robots, creeping robots, swimming robots, medical robots, military robots, handicapped-assisting robots, cleaning robots, etc.

In some alternative implementations of the present embodiment, the target mobile robot may be an autonomous vehicle.

The motion mode change request may be information used to represent the target mobile robot requesting to change the motion mode. The motion mode change request may include motion mode information of a motion mode to be obtained by change requested by the target mobile robot.

In some alternative implementations of the present embodiment, the motion mode change request includes any one of the following: a start request, a stop request, an acceleration request, a deceleration request, or a turning request.

In some alternative implementations of the present embodiment, the motion mode change request further includes an identification of the target mobile robot.

In the present embodiment, the first determining unit 502 may determine whether the target mobile robot has a permission to move in the motion mode.

It may be understood that when the target mobile robot has the permission to move in the motion mode, it may generally represent that the target mobile robot may move in the motion mode; and when the target mobile robot does not have the permission to move in the motion mode, it may generally represent that the target mobile robot cannot move in the motion mode.

In the present embodiment, when it is determined that the target mobile robot has the permission to move in the motion mode, the sending unit 503 may send motion confirmation information for the motion mode change request to the target mobile robot to control the target mobile robot to move in the motion mode.

The motion confirmation information may be used to represent that the executing body confirms the motion mode change request. After the executing body sends the motion confirmation information to the mobile robot, the target mobile robot may move in the motion mode indicated by the motion mode information included in the motion mode change request corresponding to the motion confirmation information.

In some alternative implementations of the present embodiment, the sending unit 503 may send the motion confirmation information for the motion mode change request to the target mobile robot using an over the air technology (OTA).

Here, the over the air technology is a technology for remotely managing SIM card data and applications through an air interface of mobile communication. The use of the over the air technology may simplify an operation process of sending a start instruction to the mobile robot.

In some alternative implementations of the present embodiment, the motion mode change request further includes an identification of the target mobile robot; and the first determining unit includes: an input module (not shown in the figure), configured to input the identification into a predetermined motion permission model to obtain motion permission information of the target mobile robot. Here, the motion permission model may be used to represent a corresponding relationship between the identification of the mobile robot and the motion permission information of the mobile robot. The motion permission information represents any one of the following: permission, or no permission. The identification may be a character string composed of numbers, letters, symbols (for example, underscores, etc.).

The motion permission model may be a two-dimensional table or database storing the identifications and the motion permission information of mobile robots. Alternatively, the motion permission model may be a model obtained by training an initial model (for example, a convolutional neural network) using a machine learning algorithm. Here, the technology of using a machine learning algorithm to train and obtain the model is a well-known technology that has been extensively studied at present, and detailed description thereof will be omitted.

In some alternative implementations of the present embodiment, the first determining unit includes: an acquisition module (not shown in the figure), configured to acquire at least one of: location information, or status information of the target mobile robot; and a determination module (not shown in the figure), configured to determine whether the target mobile robot has the permission to move in the motion mode, based on the acquired information.

The location information may be used to represent the location of the mobile robot.

The status information may be used to represent the status of the mobile robot. For example, the status information may include, but is not limited to: information about whether there is a fault, information about whether a fault affects motion, information about the location of a fault point, and the like.

Here, the executing body may input the acquired information (including at least one of the location information or the status information) into the permission model pre-trained for the target mobile robot to obtain the motion permission information. Here, the permission model may be configured to represent a corresponding relationship between the acquired information (including at least one of the location information or the status information) and the motion permission information. The motion permission information may represent any one of the following: permission, or no permission.

In some alternative implementations of the present embodiment, the apparatus 500 may further include: an acquisition unit (not shown in the figure), configured to acquire a real-time motion speed, real-time location information, real-time status information, and real-time environment information of the target mobile robot according to a predetermined frequency; and a second determining unit (not shown in the figure), configured to determine whether to send at least one of: warning information, or a motion mode change instruction to the target mobile robot, based on the real-time motion speed, the real-time location information, the real-time status information, and the real-time environment information.

According to the apparatus provided by above embodiments of the present disclosure, the receiving unit 501 receives a motion mode change request sent by a target mobile robot, the motion mode change request including motion mode information of a motion mode to be obtained by change requested by the target mobile robot, then, the first determining unit 502 determines whether the target mobile robot has a permission to move in the motion mode, and finally, the sending unit 503 sends motion confirmation information for the motion mode change request to the target mobile robot to control the target mobile robot to move in the motion mode, in response to determining that the target mobile robot has the permission. Therefore, by determining whether the mobile robot has the permission to move in the motion mode, whether the mobile robot changes the motion mode is determined, rather than directly changing the motion mode by the mobile robot, thereby improving the motion safety of the mobile robot.

Figure 6:
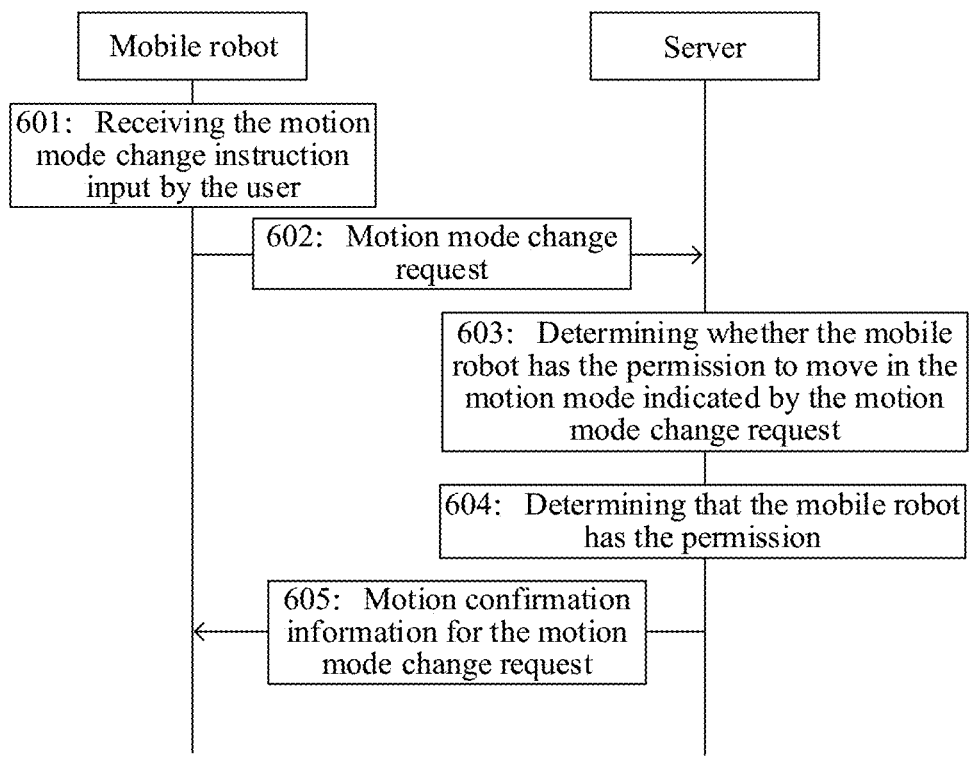
FIG. 6 is a schematic diagram of an interaction process of an embodiment of a control system according to the present disclosure.

With further reference to FIG. 6, which shows a schematic diagram of an interaction process of an embodiment of a control system according to the present disclosure.

The control system in the embodiment of the present disclosure may include a mobile robot and a server for providing support to the mobile robot, where: the mobile robot is configured to: send a motion mode change request to the server, in response to receiving a motion mode change instruction inputted by a user, the motion mode change request including motion mode information of a motion mode to be obtained by change requested by the target mobile robot. The server is configured to: determine whether the mobile robot has a permission to move in the motion mode; and send motion confirmation information for the motion mode change request to the mobile robot, in response to determining that the mobile robot has the permission.

As shown in FIG. 6, in step 601, the mobile robot receives the motion mode change instruction inputted by the user.

In the present embodiment, the mobile robot may receive the motion mode change instruction inputted by the user.

The mobile robot may be various movable (i.e., mobile) machineries. For example, the mobile robot may include, but is not limited to: aerial robots (such as drones), wheeled mobile robots (such as autonomous vehicles), walking mobile robots (one-legged, two-legged, and multi-legged mobile robots), crawler mobile robots, crawling robots, creeping robots, swimming robots, medical robots, military robots, handicapped-assisting robots, cleaning robots, etc. The motion mode change instruction may be information for instructing the mobile robot to accelerate, decelerate, turn, stop, decelerate, and so on. The motion mode change instruction may be directly inputted by the user to the mobile robot, or may be inputted by the user to the control device that the user uses to communicate with the mobile robot, and then sent by the control device to the mobile robot. The server may be a cloud server.

In step 602, the mobile robot sends the motion mode change request to the server.

In the present embodiment, the mobile robot may send the motion mode change request to the server.

The motion mode change request may be information corresponding to the motion mode change instruction in step 601 and used to represent the request of the mobile robot to change the motion mode. The motion mode change request may include motion mode information, and the motion mode information may be information of a motion mode to be obtained by change requested by the target mobile robot. For example, if the motion mode change instruction in 601 instructs the mobile robot to change to travel at a speed of 30 kilometers per hour, then the motion mode change request in step 602 may be information requesting travelling at the speed of 30 kilometers per hour.

In some alternative implementations of the present embodiment, the motion mode change request includes any one of the following: a start request, a stop request, an acceleration request, a deceleration request, or a turning request.

In some alternative implementations of the present embodiment, the motion mode change request further includes an identification of the mobile robot.

In step 603, the server determines whether the mobile robot has the permission to move in the motion mode indicated by the motion mode change request.

In the present embodiment, the server may determine whether the mobile robot has the permission to move in the motion mode indicated by the motion mode change request.

It may be understood that when the mobile robot has the permission to move in the motion mode, it may generally represent that the mobile robot may move in the motion mode; and when the mobile robot does not have the permission to move in the motion mode, it may generally represent that the mobile robot cannot move in the motion mode.

In some alternative implementations of the present embodiment, the motion mode change request further includes the identification of the mobile robot, based on this, the server may perform this step 603 according to the following step:

inputting the identification into a predetermined motion permission model to obtain motion permission information of the mobile robot. Here, the motion permission model may be used to represent a corresponding relationship between the identification of the mobile robot and the motion permission information of the mobile robot. The motion permission information represents any one of the following: permission, or no permission. The identification may be a character string composed of numbers, letters, symbols (for example, underscores, etc.).

The motion permission model may be a two-dimensional table or database storing the identifications and the motion permission information of mobile robots. Alternatively, the motion permission model may be a model obtained by training an initial model (for example, a convolutional neural network) using a machine learning algorithm. Here, the technology of using a machine learning algorithm to train and obtain the model is a well-known technology that has been extensively studied at present, and detailed description thereof will be omitted.

In some alternative implementations of the present embodiment, the server may also perform this step 603 according to the following steps.

Step one includes acquiring information at least one of location information, or status information of the mobile robot.

The location information may be used to represent the location of the mobile robot.

The status information may be used to represent the status of the mobile robot. For example, the status information may include, but is not limited to: information about whether there is a fault, information about whether a fault affects motion, information about the location of a fault point, and the like.

Step two includes determining whether the mobile robot has the permission to move in the motion mode, based on the acquired information.

Here, the server may input the acquired information (including at least one of the location information or the status information) into the permission model pre-trained for the robot to obtain the motion permission information. Here, the permission model may be configured to represent a corresponding relationship between the acquired information (including at least one of the location information or the status information) and the motion permission information. The motion permission information may represent any one of the following: permission, or no permission.

Specifically, when the acquired information includes the location information but does not include the status information, the permission model may be configured to represent a corresponding relationship between the location information and the motion permission information of the mobile robot. In this application scenario, the permission model may be a two-dimensional table or database storing the location information of the mobile robot and the motion permission information of the mobile robot.

When the acquired information includes the status information but does not include the location information, the permission model may be configured to represent a corresponding relationship between the status information and the motion permission information of the mobile robot. In this application scenario, the permission model may be a two-dimensional table or database storing the status information of the mobile robot and the motion permission information of the mobile robot.

When the acquired information includes the location information and the status information, the permission model may be configured to represent a corresponding relationship between the location information, the status information, and the motion permission information of the mobile robot. In this application scenario, the permission model may be a two-dimensional table or database storing the location information, the status information of the mobile robot, and the motion permission information of the mobile robot.

Alternatively, the permission model may be a model obtained by training an initial model (for example, a convolutional neural network) using a machine learning algorithm. Here, the technology of using a machine learning algorithm to train to obtain the model is a well-known technology that has been extensively studied at present, and detailed description thereof will be omitted.

In step 604, the server determines that the mobile robot has the permission.

In the present embodiment, the server determines that the mobile robot has the permission.

In step 605, the server sends the motion confirmation information for the motion mode change request to the mobile robot.

In the present embodiment, the server may send a start instruction including a speed limit value to the mobile robot.

The motion confirmation information may be used to represent that the executing body confirms the motion mode change request.

In some alternative implementations of the present embodiment, the server may send the motion confirmation information for the motion mode change request to the mobile robot using an over the air technology (OTA).

Here, the over the air technology is a technology for remotely managing SIM card data and applications through an air interface of mobile communication. The use of the over the air technology may simplify an operation process of sending a start instruction to the mobile robot.

In some alternative implementations of the present embodiment, the mobile robot may also move in the motion mode.

In some alternative implementations of the present embodiment, the server may also perform the following steps.

Step one includes acquiring a real-time motion speed, real-time location information, real-time status information, and real-time environment information of the mobile robot according to a predetermined frequency.

The real-time motion speed may be the motion speed of the mobile robot when the step one is performed. The real-time location information may be information that represents the location of the mobile robot when the step one is performed. The real-time status information may be information that represents the status of the mobile robot when the step one is performed. The real-time environment information may be information that represents the environment in which the mobile robot is located when the step one is performed. For example, the real-time environment information may include but is not limited to at least one of the following: weather information, road condition information, or obstacle location information.

Step two includes determining whether to send at least one of: warning information, or a motion mode change instruction to the mobile robot, based on the real-time motion speed, the real-time location information, the real-time status information, and the real-time environment information.

The warning information may be information for prompting the mobile robot or the user who controls the mobile robot that the speed of the current mobile robot is too large (exceeding the maximum speed that the current mobile robot can move). The motion mode change instruction may be information for instructing the mobile robot to change the motion mode. For example, the motion mode change instruction may be information for instructing the mobile robot to stop or decelerate.

For example, the executing body may search for transmission determining information corresponding to the real-time motion speed, the real-time location information, the real-time status information, and the real-time environment information in a predetermined information sending two-dimensional table for the mobile robot. The information sending two-dimensional table may be configured to represent a corresponding relationship between the real-time motion speed, the real-time location information, the real-time status information, the real-time environment information, and transmission determining information. The transmission determining information may be used to represent whether to send at least one of the warning information or the motion mode change instruction to the mobile robot. For example, the transmission determining information may be "yes" or "no" and the like.

Alternatively, the executing body may search for transmission determining information corresponding to the acquired real-time location information in a first two-dimensional table predetermined for the mobile robot, search for transmission determining information corresponding to the acquired real-time status information in a second two-dimensional table predetermined for the mobile robot, search for transmission determining information corresponding to the acquired real-time environment information in a third two-dimensional table predetermined for the mobile robot, and search for transmission determining information corresponding to the acquired real-time motion speed in a fourth two-dimensional table predetermined for the mobile robot. Then, a voting mechanism is used to determine whether to send at least one of the following: warning information, or a motion mode change instruction to the mobile robot.

The first two-dimensional table may be configured to represent a corresponding relationship between the real-time location information and transmission determining information. The second two-dimensional table may be configured to represent a corresponding relationship between the real-time status information and transmission determining information. The third two-dimensional table may be configured to represent a corresponding relationship between the real-time environment information and transmission determining information. The fourth two-dimensional table may be configured to represent a corresponding relationship between the real-time motion speed and transmission determining information. The transmission determining information may be used to represent whether to send at least one of the warning information or the motion mode change instruction to the mobile robot. For example, the transmission determining information may be "yes" or "no" and the like.

For example, if three of the four obtained pieces of transmission determining information represent sending information to the mobile robot, and the other one piece of transmission determining information represents not to send to the mobile robot. Then, the executing body may determine to send at least one of the warning information or the motion mode change instruction to the mobile robot.

According to the control system provided in the embodiment of the present disclosure, first, the mobile robot receives the motion mode change instruction inputted by the user, then, the mobile robot sends the motion mode change request to the server, next, the server determines whether the mobile robot has the permission to move in the motion mode indicated by the motion mode change request, after that, the server determines that the mobile robot has the permission, and finally, the server sends the motion confirmation information for the motion mode change request to the mobile robot. Therefore, by determining whether the mobile robot has the permission to move in the motion mode, whether the mobile robot changes the motion mode is determined, rather than directly changing the motion mode by the mobile robot, thereby improving the motion safety of the mobile robot.

Figure 7:
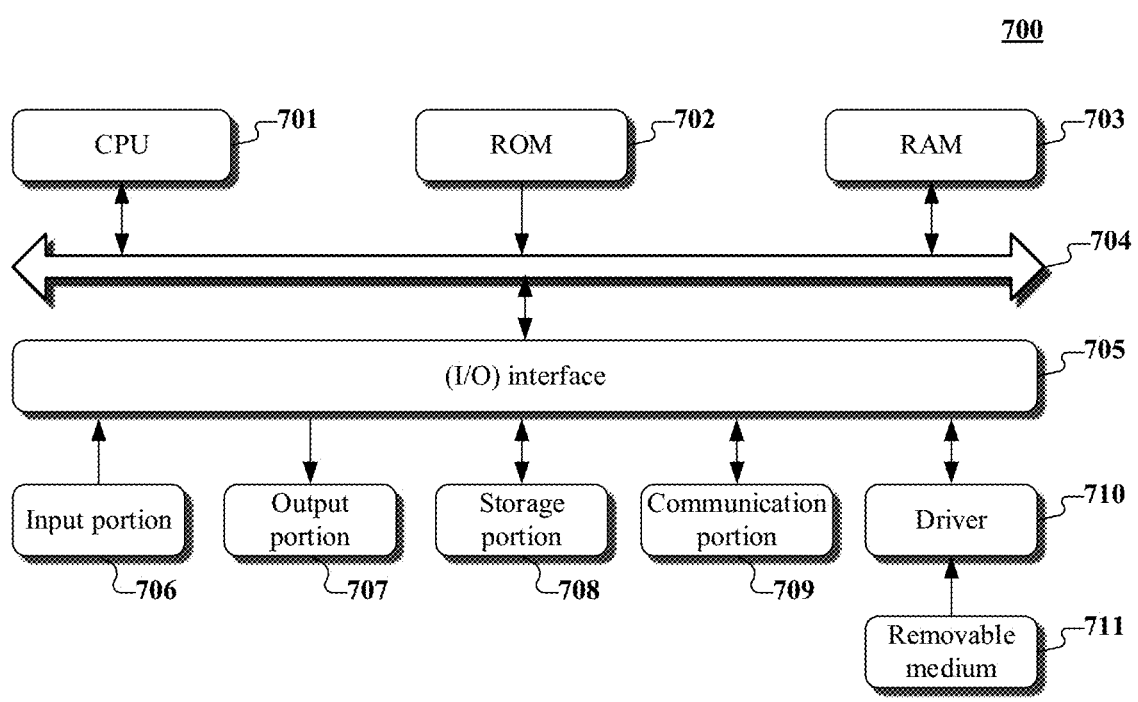
FIG. 7 is a schematic structural diagram of a computer system of an electronic device adapted for implementing embodiments of the present disclosure.

With further reference to FIG. 7, a schematic structural diagram of a computer system 700 of an electronic device adapted to implement the embodiments of the present disclosure is shown. The electronic device shown in FIG. 7 is merely an example, and should not impose any limitation on the function and scope of the embodiments of the present disclosure.

As shown in FIG. 7, the computer system 700 may include a central processing unit 701 (CPU), which may execute various appropriate actions and processes in accordance with a program stored in a read-only memory (ROM) 702 or a program loaded into a random access memory (RAM) 703 from a storage portion 708. The RAM 703 also stores various programs and data required by operations of the computer system 700. The CPU 701, the ROM 702 and the RAM 703 are connected to each other through a bus 704. An input/output (I/O) interface 705 is also connected to the bus 704.

The following components are connected to the I/O interface 705: an input portion 706 including such as a keyboard, a mouse; an output portion 707 including such as a cathode ray tube (CRT), a liquid crystal display (LCD), and a speaker; the storage portion 708 including such as a hard disk; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor including a receiving unit, a first determining unit and a sending unit. Here, the names of these units do not in some cases constitute limitations to such units themselves. For example, the receiving unit may also be described as "a unit configured to receive a motion mode change request sent by a target mobile robot".

In another aspect, the present disclosure further provides a computer readable medium. The computer readable medium may be included in the electronic device in the above described embodiments, or a stand-alone computer readable medium not assembled into the electronic device. The computer readable medium stores one or more programs. The one or more programs, when executed by the electronic device, cause the electronic device to: receive a motion mode change request sent by a target mobile robot, the motion mode change request including motion mode information, and the motion mode information being information of a motion mode to be obtained by change requested by the target mobile robot; determine whether the target mobile robot has a permission to move in the motion mode; and send motion confirmation information for the motion mode change request to the target mobile robot to control the target mobile robot to move in the motion mode, in response to determining that the target mobile robot has the permission.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for controlling a mobile robot, comprising:
receiving a motion mode change request sent by a target mobile robot, the motion mode change request comprising motion mode information, and the motion mode information being information of a motion mode to be obtained by change requested by the target mobile robot, wherein the motion mode change request is sent in response to receiving a motion mode change instruction inputted to the target mobile robot by a user, wherein the motion mode change request further comprises an identification of the target mobile robot;
determining whether the target mobile robot has a permission to move in the motion mode, wherein the determining whether the target mobile robot has a permission to move in the motion mode comprises inputting the identification into a predetermined motion permission model to obtain motion permission information of the target mobile robot, wherein the motion permission model is configured to represent a corresponding relationship between the identification of the mobile robot and a permitted speed of the mobile robot;
sending motion confirmation information for the motion mode change request to the target mobile robot and controlling the mobile robot to perform the motion mode change instruction, in response to determining that the target mobile robot has the permission.

2. The method according to claim 1, wherein the determining whether the target mobile robot has a permission to move in the motion mode, comprises:
acquiring at least one of location information, or status information of the target mobile robot; and
determining whether the target mobile robot has the permission to move in the motion mode, based on the acquired information.

3. The method according to claim 1, wherein the method further comprises:
acquiring a real-time motion speed, real-time location information, real-time status information, and real-time environment information of the target mobile robot according to a predetermined frequency; and
determining whether to send at least one of warning information or a motion mode change instruction to the target mobile robot, based on the real-time motion speed, the real-time location information, the real-time status information, and the real-time environment information.

4. The method according to claim 1, wherein the sending motion confirmation information for the motion mode change request to the target mobile robot, comprises:
sending the motion confirmation information for the motion mode change request to the target mobile robot using an over the air technology.

5. The method according to claim 1, wherein the motion mode change request comprises any one of:
a start request, a stop request, an acceleration request, a deceleration request, or a turning request.

6. The method according to claim 1, wherein the target mobile robot is an autonomous vehicle.

7. An electronic device, comprising:
one or more processors; and
a storage apparatus storing one or more programs,
wherein the one or more programs, when executed by the one or more processors, cause the one or more processors to perform operations, the operations comprising:
receiving a motion mode change request sent by a target mobile robot, the motion mode change request comprising motion mode information, and the motion mode information being information of a motion mode to be obtained by change requested by the target mobile robot, wherein the motion mode change request is sent in response to receiving a motion mode change instruction inputted to the mobile robot by a user, wherein the motion mode change request further comprises an identification of the target mobile robot;
determining whether the target mobile robot has a permission to move in the motion mode, wherein the determining whether the target mobile robot has a permission to move in the motion mode comprises inputting the identification into a predetermined motion permission model to obtain motion permission information of the target mobile robot, wherein the motion permission model is configured to represent a corresponding relationship between the identification of the mobile robot and a permitted speed of the mobile robot; and
sending motion confirmation information for the motion mode change request to the target mobile robot and controlling the mobile robot to perform the motion mode change instruction, in response to determining that the target mobile robot has the permission.

8. The electronic device according to claim 7, wherein the determining whether the target mobile robot has a permission to move in the motion mode, comprises:
acquiring at least one of location information, or status information of the target mobile robot; and
determining whether the target mobile robot has the permission to move in the motion mode, based on the acquired information.

9. The electronic device according to claim 7, wherein the operations further comprise:
acquiring a real-time motion speed, real-time location information, real-time status information, and real-time environment information of the target mobile robot according to a predetermined frequency; and
determining whether to send at least one of warning information or a motion mode change instruction to the target mobile robot, based on the real-time motion speed, the real-time location information, the real-time status information, and the real-time environment information.

10. The electronic device according to claim 7, wherein the sending motion confirmation information for the motion mode change request to the target mobile robot, comprises:
sending the motion confirmation information for the motion mode change request to the target mobile robot using an over the air technology.

11. The electronic device according to claim 7, wherein the motion mode change request comprises any one of:
a start request, a stop request, an acceleration request, a deceleration request, or a turning request.

12. The electronic device according to claim 7, wherein the target mobile robot is an autonomous vehicle.

13. A control system, comprising a mobile robot and a server for providing support to the mobile robot:
the mobile robot being configured to: receive a motion mode change instruction inputted by a user; send a motion mode change request to the server, in response to receiving a motion mode change instruction inputted by the user, the motion mode change request comprising motion mode information of a motion mode to be obtained by change requested by the target mobile robot and perform the motion mode change instruction, in response to receiving motion confirmation information from the server, wherein the motion mode change request further comprises an identification of the target mobile robot; and
the server being configured to: determine whether the mobile robot has a permission to move in the motion mode; send the motion confirmation information for the motion mode change request to the mobile robot, in response to determining that the mobile robot has the permission; and input the identification into a predetermined motion permission model to obtain motion permission information of the target mobile robot, wherein the motion permission model is configured to represent a corresponding relationship between the identification of the mobile robot and a permitted speed of the mobile robot.

14. The system according to claim 13, wherein the mobile robot is further configured to:
  move in the motion mode.

15. The system according to claim 13, wherein the server is further configured to:
  acquire a real-time motion speed, real-time location information, real-time status information, and real-time environment information of the mobile robot according to a predetermined frequency; and
  determine whether to send at least one of warning information or the motion mode change instruction to the mobile robot, based on the real-time motion speed, the real-time location information, the real-time status information, and the real-time environment information.

16. The method according to claim 1, wherein the corresponding relationship between the identification of the mobile robot and the permitted speed of the mobile robot is a corresponding relationship between the identification of the mobile robot and a permitted maximum speed of the mobile robot.

17. The method according to claim 16, wherein the corresponding relationship between the identification of the mobile robot and the permitted speed of the mobile robot is a corresponding relationship between the identification of the mobile robot and a permitted maximum speed at which the mobile robot start moving.

* * * * *